US009854528B2

(12) United States Patent
Rios, III et al.

(10) Patent No.: US 9,854,528 B2
(45) Date of Patent: Dec. 26, 2017

(54) TUNING NETWORKS AND USER EQUIPMENT USING A POWER PROFILE

(71) Applicants: AT&T Intellectual Property I, L.P., Atlanta, GA (US); AT&T Mobility II LLC, Atlanta, GA (US)

(72) Inventors: Roque Rios, III, Middletown, NJ (US); Haywood Peitzer, Randolph, NJ (US); James Gordon Beattie, Jr., Bergenfield, NJ (US); Stephen Francis Triano, Hillsborough, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/090,802

(22) Filed: Apr. 5, 2016

(65) Prior Publication Data

US 2017/0289913 A1    Oct. 5, 2017

(51) Int. Cl.
*H04M 1/00*    (2006.01)
*H04W 52/02*    (2009.01)
*H04W 60/04*    (2009.01)

(52) U.S. Cl.
CPC ....... *H04W 52/0251* (2013.01); *H04W 60/04* (2013.01)

(58) Field of Classification Search
CPC ..................... H04W 52/0251; H04W 60/04
USPC ........................................................ 455/574
See application file for complete search history.

(56) References Cited

U.S. PATENT DOCUMENTS

| 4,001,693 A | 1/1977 | Stackhouse et al. |
| 4,742,560 A | 5/1988 | Arai |
| 5,153,905 A | 10/1992 | Bergeron et al. |
| 5,408,419 A | 4/1995 | Wong |

(Continued)

FOREIGN PATENT DOCUMENTS

| EP | 1792441 | 3/2012 |
| WO | WO 02/099607 | 12/2002 |

OTHER PUBLICATIONS

Balasubramanian et al., "Energy Consumption in Mobile Phones: A Measurement Study and Implications for Network Applications," Proceedings of the 9th ACM SIGCOMM conference on Internet Measurement Conference, Nov. 4-6, 2009, ACM.

(Continued)

*Primary Examiner* — Sanh Phu

(74) *Attorney, Agent, or Firm* — Hartman & Citrin LLC

(57) ABSTRACT

Concepts and technologies are disclosed herein for tuning networks and user equipment using a power profile. A power profile can be generated for a communication device. The power profile can include power type information that can indicate a power source associated with the device. The power profile can be stored at a data storage device. A registration message can be generated. The registration message can include power profile data that is based on the power profile. The registration message can be sent to a communications network to request registration of the communication device with the communications network. A tuning message can be received. The tuning message can indicate a tuning to be used for communications with the communications network and can be based on the power profile data.

20 Claims, 8 Drawing Sheets

(56) References Cited

U.S. PATENT DOCUMENTS

| | | | |
|---|---|---|---|
| 5,862,471 A | | 1/1999 | Tiedemann, Jr. et al. |
| 5,884,172 A | | 3/1999 | Sawyer |
| 5,974,327 A | * | 10/1999 | Agrawal ............. H04W 72/082 455/452.2 |
| 6,694,145 B2 | | 2/2004 | Riikonen et al. |
| 6,731,625 B1 | | 5/2004 | Eastep et al. |
| 6,778,653 B1 | | 8/2004 | Kallas et al. |
| 6,909,708 B1 | | 6/2005 | Krishnaswamy et al. |
| 6,961,559 B1 | | 11/2005 | Chow et al. |
| 7,002,979 B1 | | 2/2006 | Schneider et al. |
| 7,003,331 B2 | | 2/2006 | Cromer et al. |
| 7,233,605 B1 | | 6/2007 | Oran |
| 7,274,929 B1 | | 9/2007 | Banginwar |
| 7,558,965 B2 | | 7/2009 | Wheeler et al. |
| 7,577,113 B2 | | 8/2009 | Alon et al. |
| 7,634,269 B2 | | 12/2009 | Gallagher |
| 7,908,295 B2 | | 3/2011 | Hindle et al. |
| 8,045,700 B2 | | 10/2011 | Bruce et al. |
| 8,135,443 B2 | | 3/2012 | Aleksic et al. |
| 8,249,106 B2 | | 8/2012 | Samuel et al. |
| 8,264,987 B2 | | 9/2012 | Baum et al. |
| 8,270,421 B2 | | 9/2012 | Elliott et al. |
| 8,351,341 B1 | | 1/2013 | Callon |
| 8,498,592 B2 | | 7/2013 | Mishra et al. |
| 8,769,140 B2 | | 7/2014 | Chen et al. |
| 8,780,711 B2 | | 7/2014 | Baliga et al. |
| 9,020,483 B1 | | 4/2015 | Peitzer et al. |
| 9,161,266 B2 | | 10/2015 | Slack |
| 2001/0014095 A1 | | 8/2001 | Kawahata et al. |
| 2004/0096045 A1 | | 5/2004 | Suffern |
| 2004/0260466 A1 | | 12/2004 | Ichihara |
| 2005/0180397 A1 | | 8/2005 | Yeom |
| 2005/0190756 A1 | | 9/2005 | Mundra et al. |
| 2005/0226227 A1 | | 10/2005 | Kim et al. |
| 2006/0063538 A1 | | 3/2006 | Ishii |
| 2007/0049354 A1 | * | 3/2007 | Jin .................... H04W 52/0277 455/574 |
| 2007/0081498 A1 | | 4/2007 | Niwano |
| 2009/0099851 A1 | | 4/2009 | Pilati et al. |
| 2009/0201862 A1 | | 8/2009 | Okker et al. |
| 2010/0128645 A1 | | 5/2010 | Lin et al. |
| 2010/0195643 A1 | | 8/2010 | Kodali |
| 2011/0131409 A1 | | 6/2011 | Cohen et al. |
| 2012/0034910 A1 | | 2/2012 | Fang et al. |
| 2012/0214468 A1 | | 8/2012 | Tadayon et al. |
| 2012/0315960 A1 | | 12/2012 | Kim |
| 2013/0054493 A1 | | 2/2013 | McDysan et al. |
| 2013/0301500 A1 | | 11/2013 | Koc et al. |
| 2015/0056947 A1 | | 2/2015 | Panchal et al. |
| 2015/0103953 A1 | | 4/2015 | Lee et al. |
| 2015/0230195 A1 | | 8/2015 | Peitzer et al. |

OTHER PUBLICATIONS

Sharma et al., "Capability-Based Modeling of Services in Mobile Systems," [retrieved from www.ee.iitb.ac.in/~hpc/.old_studs/hrishi_page/rsch/cap_details.pdf on Oct. 11, 2013].

Sauter, Martin, "doesBenefitFromBatteryConsumptionOptimisation," WirelessMoves, Thoughts on the Evolution of Wireless Networks and Mobile Web 2.0, Mar. 22, 2011.

U.S. Notice of Allowance dated Dec. 18, 2014 in U.S. Appl. No. 14/090,606.

U.S. Office Action dated Dec. 15, 2015 in U.S. Appl. No. 14/696,689.

* cited by examiner

TUNING NETWORKS AND USER EQUIPMENT USING A POWER PROFILE

BACKGROUND

The use of communication devices (e.g., cellular phones, smartphones, tablet computers, and the like) has proliferated over the past few years. Modern communication devices may communicate with multiple networks, including background communications and background data transfers, which can quickly consume battery life and/or other power resources. Thus, while battery technologies have improved drastically over the past several years, battery life for communication devices can be short.

Furthermore, many modern devices (e.g., refrigerators, cars, weather devices, and the like) may be equipped for communications and may register with wireless networks to communicate certain information. These devices may have vastly different requirements relative to one another, but may nonetheless be registered by networks in a similar or even identical manner relative to one another. Thus, some communication paths associated with some devices may be unusable or inefficient, but nonetheless may be provisioned for the device due to a "one size fits all" approach to device registration.

SUMMARY

The present disclosure is directed to tuning networks and user equipment using a power profile. A power profile can be generated for a user equipment or other device such as, for example, a communication device. According to various embodiments, the power profile can be generated for the communication device using a power management application executed by the communication device, by other devices (e.g., a device manufacturer, programmer, or the like), and/or by other entities. Furthermore, the power profile can be created, modified, and/or replaced at various times, by various entities, and/or for various reasons. The power profile can indicate network and/or device tunings that can be used to maximize power management for the one or more devices based on types of content, content type priorities, network capabilities, motion status, power types, and/or other aspects of the one or more devices.

The communication device can extract power profile data from the power profile and can include the power profile data in a registration message. Thus, the power profile can be used (by way of receiving portions of the power profile) by a network element during registration of the communication device for communications on a network. The power profile data and/or other portions of the power profile can be included in other types of messages and/or communications such as the update, for example. A device on the wireless network or other networks and/or devices can receive the registration message and can determine that the power profile data is included as part of, or as being included with, the registration message. The wireless network or a device associated with the wireless network such as, for example a BTS, a communication manager, or the like, can be configured to recognize the power profile data and to use the power profile data to configure the wireless network and/or components thereof.

The wireless network can be configured to send a tuning message to the communication device. The communication device can use the tuning message to tune its own communication characteristics. Thus, the tuning message can be used so that communications between the communication device and the wireless network can occur over the determined channels, using the determined bearers, and/or in accordance with various determined communication characteristics such as, for example, power levels, codes, times, the like.

According to one aspect of the concepts and technologies disclosed herein, a device is disclosed. The device can include a processor and a memory. The memory can store computer-executable instructions that, when executed by the processor, can cause the processor to perform operations. The operations can include generating a power profile for a communication device. The power profile can include power type information that can indicate a power source associated with the communication device. The operations further can include storing the power profile at a data storage device, generating a registration message that includes power profile data that is based on a power profile, sending the registration message to a communications network to request registration with the communications network, and receiving a tuning message that indicates a tuning to be used for communications with the communications network. The tuning can be based on the power profile data.

In some embodiments, the computer-executable instructions, when executed by the processor, can cause the processor to perform operations further including determining that an update should be generated based on detecting a status change of a power source; generating an update including a new version of the power profile data; and sending the update to the communications network. In some embodiments, the computer-executable instructions, when executed by the processor, can cause the processor to perform operations further including determining that an update should be generated based on detecting a change to a communication channel; generating an update including a new version of the power profile data; and sending the update to the communications network.

In some embodiments, sending the registration message can include sending the registration message to a network element. The power profile data can be used to tune a network. In some embodiments, generating the power profile can further include determining content type capabilities associated with the communication device; determining content type priorities associated with the communication device; determining network capabilities associated with the communication device; and determining a motion status associated with the communication device. In some embodiments, the computer-executable instructions, when executed by the processor, can cause the processor to perform operations further including tuning communications based on the tuning message. In some embodiments, tuning can include moving a communication from a first path to a second path. In some embodiments, tuning can include terminating a communication.

According to another aspect of the concepts and technologies disclosed herein, a computer storage medium is disclosed. The computer storage medium can have computer-executable instructions stored thereon that, when executed by a processor, can cause the processor to perform operations. The operations can include generating a power profile for a communication device. The power profile can include power type information that can indicate a power source associated with the communication device. The operations further can include storing the power profile at a data storage device, generating a registration message that includes power profile data that is based on a power profile, sending the registration message to a communications network to request registration with the communications network, and receiving a tuning message that indicates a tuning to be used for communications with the communications network. The tuning can be based on the power profile data.

In some embodiments, the computer-executable instructions, when executed by the processor, can cause the processor to perform operations further including determining that an update should be generated based on detecting a status change of a power source; generating an update including a new version of the power profile data; and sending the update to the communications network. In some embodiments, the computer-executable instructions, when executed by the processor, can cause the processor to perform operations further including determining that an update should be generated based on detecting a change to a communication channel; generating an update including a new version of the power profile data; and sending the update to the communications network.

In some embodiments, sending the registration message can include sending the registration message to a network element. The power profile data can be used to tune a network. In some embodiments, generating the power profile can further include determining content type capabilities associated with the communication device; determining content type priorities associated with the communication device; determining network capabilities associated with the communication device; and determining a motion status associated with the communication device. In some embodiments, the computer-executable instructions, when executed by the processor, can cause the processor to perform operations further including tuning communications based on the tuning message.

According to yet another aspect, a method is disclosed. The method can include generating, by a processor that executes a power management application, a power profile for a communication device. The power profile can include power type information that can indicate a power source associated with the device. The method also can include storing, by the processor, the power profile at a data storage device; generating, by the processor, a registration message that includes power profile data that is based on the power profile; sending, by the processor, the registration message to a communications network to request registration of the communication device with the communications network; and receiving, by the processor, a tuning message that can indicate a tuning to be used for communications with the communications network. The tuning can be based on the power profile data.

The method further can include determining that an update should be generated based on detecting a status change of a power source; generating an update including a new version of the power profile data; and sending the update to the communications network. The method further can include determining that an update should be generated based on detecting a change to a communication channel; generating an update including a new version of the power profile data; and sending the update to the communications network.

In some embodiments, sending the registration message can include sending the registration message to a network element. The power profile data can be used to tune a network. In some embodiments, generating the power profile can further include determining content type capabilities associated with the communication device; determining content type priorities associated with the communication device; determining network capabilities associated with the communication device; and determining a motion status associated with the communication device. The method further can include tuning communications based on the tuning message.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
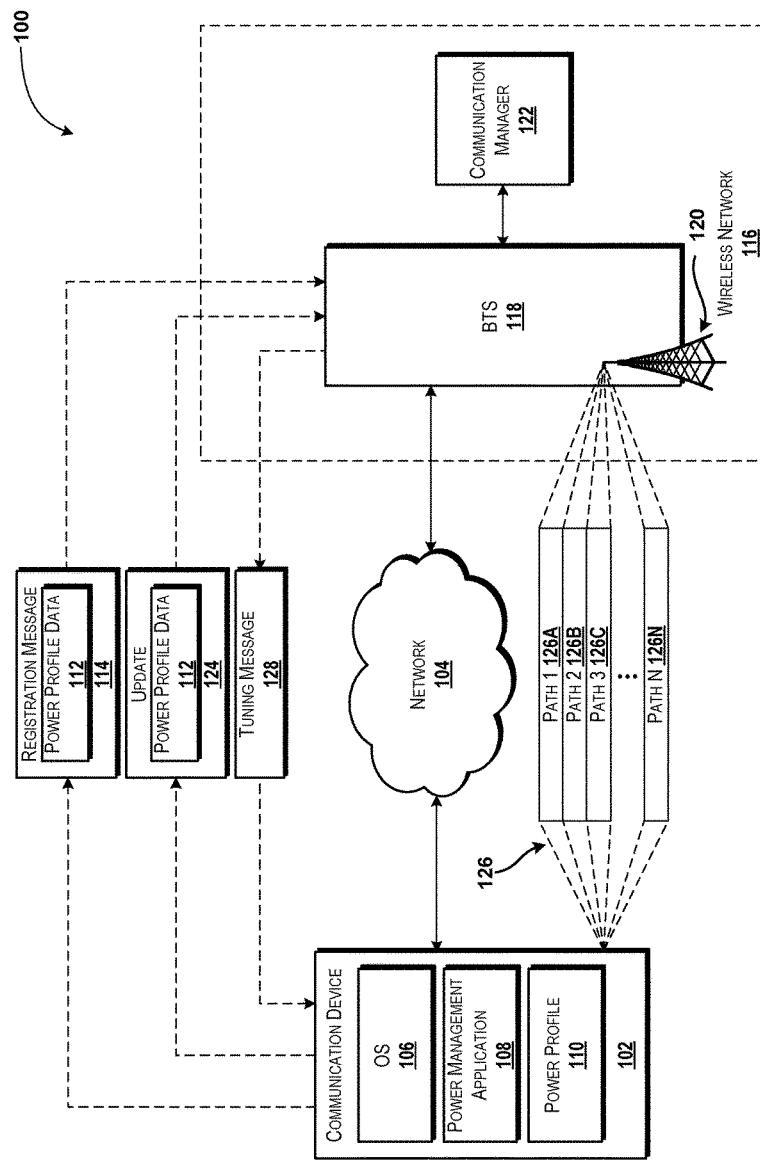
FIG. 1 is a system diagram illustrating an illustrative operating environment for various embodiments of the concepts and technologies described herein.

The following detailed description is directed to tuning networks and user equipment using a power profile. A power profile can be generated for a device such as, for example, a communication device. According to various embodiments, the power profile can be generated for the communication device using a power management application executed by the communication device, by other devices (e.g., a device manufacturer, programmer, or the like), and/or by other entities. Furthermore, the power profile can be created, modified, and/or replaced at various times, by various entities, and/or for various reasons. The power profile can indicate network and/or device tunings that can be used to maximize power management for the one or more devices based on types of content, content type priorities, network capabilities, motion status, power types, and/or other aspects of the one or more devices.

The communication device can extract power profile data from the power profile and can include the power profile data in a registration message. Thus, the power profile can be used (by way of receiving portions of the power profile) by a network element during registration of the communication device for communications on a network. The power profile data and/or other portions of the power profile can be included in other types of messages and/or communications such as the update, for example. A device on the wireless network or other networks and/or devices can receive the registration message and can determine that the power profile data is included as part of, or as being included with, the registration message. The wireless network or a device associated with the wireless network such as, for example a BTS, a communication manager, or the like, can be configured to recognize the power profile data and to use the power profile data to configure the wireless network and/or components thereof.

The wireless network can be configured to send a tuning message to the communication device. The communication device can use the tuning message to tune its own communication characteristics so that communications between the communication device and the wireless network can occur over the determined channels, using the determined bearers, and/or in accordance with various determined communication characteristics such as, for example, power levels, codes, times, the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for tuning networks and user equipment using a power profile will be described, according to an illustrative embodiment. The operating environment 100 shown in FIG. 1 includes a communication device 102. The communication device can operate in communication with and/or as part of a communications network ("network") 104, though this is not necessarily the case.

According to various embodiments, the functionality of the communication device 102 may be provided by one or more server computers, desktop computers, mobile telephones, laptop computers, set-top boxes, gateway devices, vehicle computing systems, other computing systems, and the like. It should be understood that the functionality of the communication device 102 can be provided by a single device, by two or more similar devices, and/or by two or more dissimilar devices. For purposes of describing the concepts and technologies disclosed herein, the communication device 102 is described herein as a smartphone. It should be understood that this embodiment is illustrative, and should not be construed as being limiting in any way.

The communication device 102 can execute an operating system 106 and one or more application programs such as, for example, a power management application 108. The operating system 106 can include a computer program that can control the operation of the communication device 102. The power management application 108 can include an executable program that can be configured to execute on top of the operating system 106 to provide various functions as illustrated and described herein.

The power management application 108 can be configured to generate, store, and retrieve a power profile 110. In some embodiments, the power management application 108 can be configured to extract data from, or generate data based upon, the power profile 110. For example, the power management application 108 can be configured extract one or more data elements from the power profile 110 for use as power profile data 112. The power profile data 112 can be temporarily or permanently stored, in some embodiments, or used for various purposes without permanent or temporary storage. In some other embodiments, the power profile data 112 can be included in a registration message 114. In one contemplated embodiment, the power management application 108 can be configured to generate the power profile data 112 as a header or other data element for inclusion in/with the registration message 114, where the power profile data 112 can include one or more bits of data relating to the power profile 110. It should be understood that this example is illustrative and therefore should not be construed as being limiting in any way.

In one embodiment, which is illustrated in FIG. 1, the power management application 108 can be configured to generate, store, access, and/or transmit a power profile 110 that can include multiple types of information. For example, the power profile 110 can specify for a particular device such as the communication device 102, various types of information such as, for example, content type capabilities information, content type priority information, network capabilities information, motion status information, power type information, other types of information, combinations thereof, or the like. Each of these types of information is described below. Because the power profile 110 can include additional and/or alternative types of information, it should be understood that the illustrated and described example is illustrative and therefore should not be construed as being limiting in any way.

The content type capabilities information can indicate content types that a device (e.g., the communication device 102) is capable of sending, receiving, and/or otherwise interacting with. Thus, the content type capabilities information can indicate specific content formats that can be sent, received, and/or interacted with by the communication device 102; content sources that can be interacted with by the communication device 102; or the like. The content type capabilities can also indicate communication channels that the communication device 102 is capable of using. Thus, for example, the content type capabilities can indicate voice, data, text, and/or other types of content that the communication device 102 can send, receive, and/or interact with. It should be noted that specific communication channels may also be indicated by other information such as the network capabilities information, in some embodiments.

It can be appreciated that the content type capabilities of the communication device 102 can affect power usage of the communication device 102. In particular, some types of content may affect power usage and/or power sources more than other types of content. For example, receiving a text message via a short message service ("SMS") may consume less power than sending or receiving a voice call over a voice channel (e.g., because of transmitter power required for true voice calls, etc.). Thus, the content type capabilities information can indicate what power needs of the communication device 102 may be used during operation, as well as other information. It should be understood that this example is illustrative and therefore should not be construed as being limiting in any way.

According to various embodiments of the concepts and technologies described herein, the content type capabilities information can indicate one or more content types. For example, the content type capabilities information can correspond to a list of capabilities that can represent some or all available content types for the communication device 102. Of course, other formats are possible and are contemplated, and as such, it should be understood that this example is illustrative and therefore should not be construed as being limiting in any way.

The content type priority information can indicate and/or define what priority is given to each type of content that the communication device 102 is capable of interacting with. The content type priorities information can indicate, for example, relative or absolute priorities for each content type the communication device 102 is capable of interacting with, or at least one or more of those content types. Thus, the content type priorities information can be used to prioritize content types. Thus, for example, a user or other entity may indicate that some content types are to be prioritized at the expense of others, or the like.

Content type priorities can affect the power profile 110. In particular, if a user or other entity indicates that a particular content type is prioritized such that other operations of the device may be suspended to allow interactions with that particular content type, the power requirements of the device may be changed (e.g., increased to support interactions that otherwise may be suspended). For example, if a communication device 102 is configured to prioritize voice calls with a top priority, a power profile 110 may indicate higher power requirements given the relatively high power consumption associated with some voice calls (relative to some data connections, execution of applications native to the communication device 102, or the like). Thus, the content type priorities information can be used to prioritize content types so that the power profile 110 can reflect expected/desired usage of the communication device 102 and adjustment of power profiles in accordance with those expected/desired usage characteristics.

The network capabilities information can indicate and/or define what communication abilities and/or capabilities of the communication device 102. Thus, for example, the network capabilities can indicate what communication channels the communication device 102 is capable of using, what bearers the communication device 102 is capable of using, whether the communication device 102 is capable of operating over multiple channels and/or radio access bearers ("RABs") at once (e.g., whether a communication device 102 is mRAB-capable), what voice and/or data technologies the communication device 102 is capable of using, what frequencies the communication device 102 is capable of using, and the like.

The network capabilities information can affect the power profile 110 because certain communications may be moved from a first channel, medium, bearer, or the like having a first power consumption rate to a second channel, medium, bearer, or the like having a second power consumption rate if the communication device 102 is capable of communicating over both channels. By way of example, a network element may downgrade or disable certain data or radio services when resources for the communication device 102 are stressed, heavily utilized, or the like, if the communication device 102 is capable of carrying on its highly prioritized communications without those services. Thus, it can be appreciated that the priorities and capabilities can be used in conjunction with one another to provide network tuning that meets customers' needs and preferences while providing optimal power performance, in some embodiments. It should be understood that this example is illustrative and therefore should not be construed as being limiting in any way.

The motion status information can indicate whether the communication device 102 is mobile or stationary (or typically mobile or stationary). For example, a vehicle computing system, tablet, smartphone, or the like can generally be indicated as being "mobile" while a home gateway device, PC, server computer, or the like may generally be referred to as "stationary." While these above-enumerated (and other types of) devices may periodically be mobile and/or stationary, these devices typically may be characterized as being one or the other. As such, in some embodiments the motion status information can include a binary indicator such as, for example, "mobile" or "stationary," while in some other embodiments, the motion status information can include other types of indicators such as, for example, a ratio of usage of the communication device 102 as mobile vs. stationary (or vice versa); an indicator of how often the communication device 102 is mobile, an indication of how often the communication device 102 is stationary, combinations thereof, or the like. Because other types of indications are possible and are contemplated, it should be understood that these examples are illustrative and therefore should not be construed as being limiting in any way.

Whether a device is mobile or stationary can be made part of a power profile 110 for several reasons. For example, if a device is mobile, its power sources may be less predictable and/or more limited (e.g., an internal battery, possible portable power sources, etc.), while stationary devices may generally have more predictable power sources. Thus, devices that are mobile may be deemed to have limited or unpredictable power sources relative to fixed or stationary devices, which may be deemed to have predictable or unlimited power sources. The power profile 110 can reflect this information so that tuning of the network and/or the communication device 102 may have less of an impact on devices with limited power sources. It should be understood that these examples are illustrative and therefore should not be construed as being limiting in any way.

The power type information can indicate whether the communication device 102 is on internal power, external power, whether the power source is full, charging, X-percent full, X-percent depleted, combinations thereof, or the like. Thus, the power type information can indicate what power capabilities of the communication device 102 exist, as well as a state of the power capabilities. The power type information also can reflect, for one or more power sources associated with the communication device 102, a status of the power device including power charge, rate of depletion, rate of charging, expected life, etc. These and other types of information can be used when tuning the network and/or the communication device 102 by considering not only current life/charge of the power source, but also a depletion or replenishment trend, an expected life, or the like. It should be understood that these examples are illustrative and therefore should not be construed as being limiting in any way.

According to various embodiments, the communication device 102 can be configured, for example via execution of the power management application 108, to transmit one or more portions of the power profile 110 to various recipients. Thus, for example, the communication device 102 can extract, from the power profile 110, one or more data bits or other portions of data that can represent the content type capabilities, the content type priorities, the network capabilities, the motion status, the power type, and/or other aspects of the communication device 102. For example, the communication device 102 can be configured to extract one or more bits of information from the power profile 110 and store and/or use the one or more bits as power profile data 112. As will be illustrated and described in more detail below, the power profile data 112 can be included, in some embodiments, as part of a registration message 114. It should be understood that this example is illustrative and therefore should not be construed as being limiting in any way.

In some embodiments, the registration message 114 can be used to register the communication device 102 with a network (or a portion of a network) such as the network 104, a wireless network 116, or the like. In some embodiments, the communication device 102 can transmit the registration message 114 to a network element such as a base transceiver station ("BTS") 118, a NodeB, an eNodeB, or other hardware such as controllers (BSCs, RNCs, or the like). In some embodiments, the registration message 114 can be transmitted via an antenna or tower ("antenna") 120. The examples of a BTS 118 and the antenna 120 is illustrated and described for the sake of illustration and it therefore should be understood that this example is not limiting in any way.

The BTS 118 or other hardware associated with the wireless network 116 can include and/or can communicate with a module, hardware element, application, or the like, to apply the power profile 110 (e.g., by way of the power profile data 112) to communications. In one contemplated embodiment, the BTS 118 can include and/or can communicate with a communication manager 122. According to various embodiments, the communication manager 122 can include a processor that executes instructions stored in a memory to perform the functionality illustrated and described herein with reference to the communication manager 122. It should be understood that this example is illustrative and therefore should not be construed as being limiting in any way.

In some embodiments, the communication manager 122 can be configured to apply the power profile 110 to communications including, but not limited to, communications occurring via the BTS 118. In some other embodiments, the BTS 118 can include a communication manager 122 that can apply the power profile 110 to communications occurring via the BTS 118 at the radio level. Thus, some embodiments of the concepts and technologies described herein can allow a BTS 118 or even a radio or other transceiver within the BTS 118 to apply aspects of the power profile 110 to make communication and/or tuning decisions at the radio level without requiring intervention from network devices, systems, hardware, software, and/or other elements. It should be understood that these examples are illustrative and therefore should not be construed as being limiting in any way.

Because various embodiments of the concepts and technologies described herein can use the power profile 110 to tune communications, it can be appreciated that various tuning and power management decisions can be offloaded from one or more networks and/or network devices to radios, combiners, transceivers, or the like at a cellular or other wireless networking site such as the BTS 118, the antenna 120, base station controller ("BSC"), radio network controller ("RNC"), or the like. Furthermore, as will be illustrated and described in more detail below, the communication device 102 can be configured to update network tuning using the power profile 110. Thus, in some embodiments, the power profile data 112 can be included in an update message ("update") 124, which the communication device 102 can generate and/or transmit at various times. The communication device 102 can transmit the update 124 to various entities such as, for example, the BTS 118 and/or other devices, systems, and/or networks. It should be understood that this example is illustrative and therefore should not be construed as being limiting in any way.

As shown in FIG. 1, the communication device 102 can communicate with the wireless network 116 via one or more paths 126A-N (hereinafter collectively and/or generically referred to as "paths 126"). The paths 126 illustrated in FIG. 1 can correspond to one or more communication channels, one or more communication paths, one or more bearers, one or more media (e.g., voice communications, data communications, or the like), combinations thereof, or the like. Thus, the paths 126 schematically illustrate the various manners in which the communication device 102 can communicate with or via the wireless network 116.

According to various embodiments of the concepts and technologies described herein, the paths 126 can have different associated power consumption rates and/or other power characteristics. Thus, for example, communications via a first path 126A may consume power at a rate that exceeds a rate at which power is consumed for communications via a second path 126B, or vice versa. It should be understood that this example is illustrative and therefore should not be construed as being limiting in any way.

Thus, embodiments of the concepts and technologies described herein include the communication manager 122 determining, based upon the power profile data 112 provided in a registration message 114 or update 124, whether some communications associated with the communication device 102 should be suspended, initiated, moved to other paths 126, combinations thereof, or the like. The communication manager 122 can therefore execute one or more operations to consider the power profile 110 associated with the communication device 102 (e.g., via analysis of the power profile data 112) and tune a network (e.g., the wireless network 116) in response to this consideration.

Tuning the network as illustrated and described herein can include the communication manager 122 moving some communications from one path 126 to another path 126 (e.g., from one channel to another, from one medium to another, from one bearer to another, or the like); suspending some communications; degrading quality associated with some communications (or an associated path 126); combinations thereof, or the like. Decisions of the communication manager 122 can be based upon the power profile data 112, which can reflect content type capabilities, content type priorities, network capabilities, motion status, and/or power type information for the communication device 102. The communication manager 122 also can be configured to generate a message describing the tuning ("tuning message") 128 and send the tuning message 128 to the communication device 102.

The communication device 102 can be configured to adjust communications in accordance with the tuning message 128. Thus, for example, if the tuning message 128 indicates that a particular communication has been moved from a first communication channel to a second communication channel, the communication device 102 can make a corresponding change (and move its communications to the second communication channel). It should be understood that this example is illustrative and therefore should not be construed as being limiting in any way.

In some embodiments of the concepts and technologies described herein, the power profile 110 for a particular device such as the communication device 102 can be set by various devices or entities and loaded to or otherwise stored at the communication device 102. For example, some embodiments of the concepts and technologies described herein include storing the power profile 110 at a subscriber identity module ("SIM") associated with the communication device 102, a memory or other data storage device associated with the communication device 102, or the like. The power profile 110 can be created or generated by the communication device 102, for example by the power management application 108, or by other entities.

In one embodiment of the concepts and technologies described herein, the power profile 110 can be generated by a computing device such as, for example, a device associated with a device manufacturer, a device retailer, a device distributer, or the like, for the communication device 102. Thus, for example, a manufacturer may generate the power profile 110 using a computing device and store the power profile 110 at the communication device 102 by flashing a BIOS or SIM card, by storing the data in a memory, by configuring the communication device 102 to include the power profile 110 in a registration message 114, combinations thereof, or the like. It should be understood that these examples are illustrative and therefore should not be construed as being limiting in any way.

In practice, a power profile 110 can be generated for a particular device such as, for example, the communication device 102. According to various embodiments, the power profile 110 can be generated for the communication device 102 using a power management application 108 executed by the communication device 102, by other devices (e.g., a device manufacturer, programmer, or the like), and/or by other entities. Furthermore, the power profile 110 can be created, modified, and/or replaced at various times, by various entities, and/or for various reasons.

The power profile 110 can indicate, for one or more devices (e.g., the communication device 102), network and/or device tunings that can be used to maximize power management for the one or more devices. For example, the power profile 110 can indicate how networks and/or the device should be tuned based on specific types of content, content type priorities, network capabilities, motion status, power types, and/or other aspects of the one or more devices. In one embodiment, the power profile 110 can include five indicators, where one indicator indicates a content type capability of the one or more device; one indicator indicates a content type priority of the one or more device; one indicator indicates a network capability of the one or more device; one indicator indicates a motion status of the one or more device; and one indicator indicates a power type of the one or more device. It should be understood that this example is illustrative and therefore should not be construed as being limiting in any way.

According to various embodiments, the communication device 102 can extract power profile data 112 from the power profile 110. The power profile data 112 can be included as a header, flag, element, or other portion of a registration message 114. Thus, the power profile 110 can be used (by way of receiving portions of the power profile 110) by a network element during registration of the communication device 102 for communications on a network such as the wireless network 116 illustrated and described herein. As noted above, the power profile data 112 and/or other portions of the power profile 110 can be included in other types of messages and/or communications such as the update 124, for example. Thus, it should be understood that the example of including power profile data 112 in a registration message 114 examples is illustrative and therefore should not be construed as being limiting in any way.

The power profile 110 can be stored at the communication device 102. In some embodiments, for example, the power profile 110 can be stored in a memory, a subscriber identity module ("SIM") or other device, combinations thereof, or the like. In yet other embodiments, the power profile 110 can be stored by an application (e.g., the power management application 108) as preferences, options, settings, combinations thereof, or the like. The communication device 102 can be configured to retrieve the power profile 110 at various times and/or for various purposes as noted above. For example, the communication device 102 can be configured to retrieve the power profile 110 and/or information from the power profile 110 during power-up, during registration (e.g., when preparing a registration message 114 or the like), when switching networks (e.g., when roaming onto a new network, leaving a network, or during a handoff), at various other times, combinations thereof, or the like. Because the power profile 110 can be used at any time, it should be understood that these examples are illustrative and therefore should not be construed as being limiting in any way.

A device on the wireless network 116 or other networks and/or devices can receive the registration message 114 and can determine that the power profile data 112 is included as part of, or as being included with, the registration message 114. The wireless network 116 or a device associated with the wireless network 116 such as, for example a BTS 118, a communication manager 122, or the like, can be configured to recognize the power profile data 112 and to use the power profile data 112 to configure the wireless network 116 and/or components thereof.

Thus, the power profile data 112 can be used to tune the wireless network 116 and/or portions thereof in accordance with the power profile 110. Additionally, the one or more components of the wireless network 116 can be configured to send a tuning message 128 to the communication device 102. As explained above, the communication device 102 can use the tuning message 128 to tune its own communication characteristics so that communications between the communication device 102 and the wireless network 116 can occur over the determined channels, using the determined bearers, and/or in accordance with various determined communication characteristics such as, for example, power levels, codes, times, the like. It should be understood that these examples are illustrative and therefore should not be construed as being limiting in any way.

Furthermore, as noted above, the power profile 110 and/or the power profile data 112 can be applied, in some embodiments, by devices or software modules. Thus, for example, the communication manager 122 or other devices may use the power profile 110 and/or the power profile data 112 to tune the wireless network 116 and/or the communication device 102. In some other embodiments, the power profile 110 and/or the power profile data 112 can be applied to communications by hardware devices such as radios, combiners, transceivers, receivers, transmitters, or the like, without involvement by other devices. Thus, the power profile 110 can be applied to communications in various manners including, but not limited to, at the radio level, at the device level, and/or at a control and/or signaling level such as by network operations systems or the like. It should be understood that these examples are illustrative and therefore should not be construed as being limiting in any way.

According to various embodiments of the concepts and technologies described herein, the communication device 102 can be configured to update tuning associated with the communication device 102 at any time. In particular, the communication device 102 can be configured to submit and/or resubmit the power profile 110 and/or the power profile data 112 (or updated versions thereof) at various times and/or in response to various conditions. Thus, for example, the communication device 102 can submit the power profile 110, the power profile data 112, and/or updated versions thereof when registering with a new device or network, when roaming, when switching towers, when power sources change at the communication device 102, when other factors change, at other times, combinations thereof, or the like. Thus, in addition to tuning the wireless network 116 and/or the communication device 102 for communications, the power profile 110 and/or the power profile data 112 can be used by various embodiments of the concepts and technologies described herein to update, modify, and/or replace tuning at various times. These and other aspects of the concepts and technologies described herein will be illustrated and described in more detail below.

FIG. 1 illustrates one communication device 102, one network 104, one wireless network 116, one BTS 118, one antenna 120, one communication manager 122, and four paths 126. It should be understood, however, that various implementations of the operating environment 100 include zero, one, or more than one communication device 102; zero, one, or more than one network 104; zero, one, or more than one wireless network 116; zero, one, or more than one BTS 118; zero, one, or more than one antenna 120; and/or zero, one, or more than one communication manager 122; and/or one, two, three, four, or more than four paths 126. As such, the illustrated embodiment should be understood as being illustrative, and should not be construed as being limiting in any way.

Figure 2:
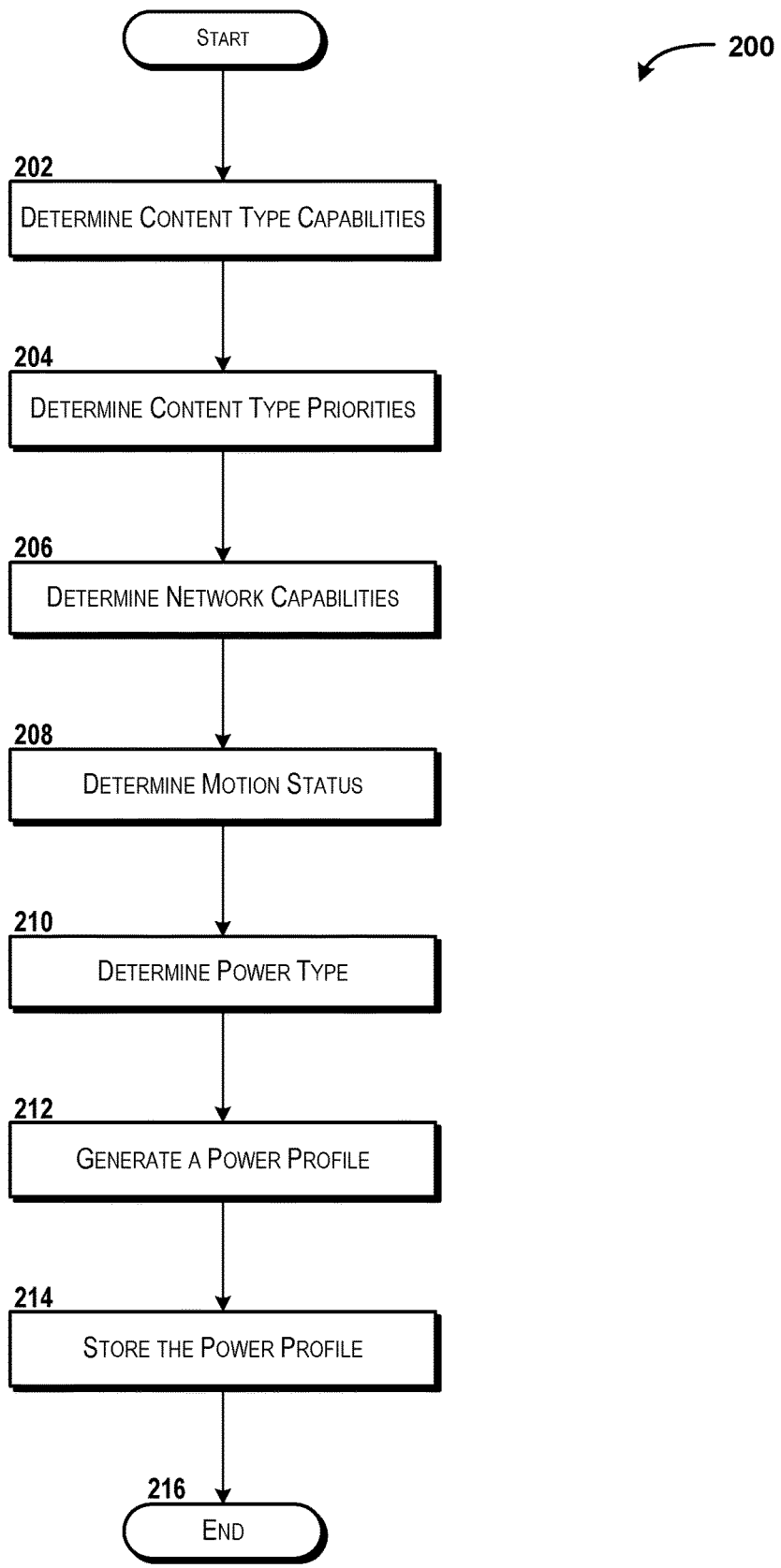
FIG. 2 is a flow diagram showing aspects of a method for generating a power profile, according to an illustrative embodiment of the concepts and technologies described herein.

Turning now to FIG. 2, aspects of a method 200 for generating a power profile will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the communication device 102 and/or the communication manager 122, to perform one or more operations and/or causing the processor to direct other components of the computing system or device to perform one or more of the operations.

For purposes of illustrating and describing the concepts of the present disclosure, the method 200 is described as being performed by the communication device 102 via execution of one or more software modules such as, for example, the power management application 108. It should be understood that additional and/or alternative devices and/or network nodes can provide the functionality described herein via execution of one or more modules, applications, and/or other software including, but not limited to, the power management application 108. For example, as explained above with reference to FIG. 1, some or all of the operations of the method 200 can be executed by a computer device via execution of various application programs including, but not limited to, a power management application 108. Thus, the illustrated embodiments are illustrative, and should not be viewed as being limiting in any way.

The method 200 begins at operation 202. At operation 202, the communication device 102 determines content type capabilities for the communication device 102. According to various embodiments of the concepts and technologies described herein, the content type capabilities can refer to types of content the communication device 102 can send, receive, and/or otherwise interact with. Additionally, or alternatively, the content type capabilities can indicate communication channels that the communication device 102 is capable of using. Thus, for example, the content type capabilities can indicate voice, data, text, and/or other types of content that the communication device 102 can send, receive, and/or interact with.

The content type capabilities can affect power usage of the communication device 102 because certain types of content may affect power more than other types of content. For example, a message over a control channel may consume less power than a peer-to-peer data connection for transmitting packet data. It should be understood that this example is illustrative and therefore should not be construed as being limiting in any way.

According to various embodiments, the content type capabilities can indicate one or more content types. Thus, in some embodiments the content type capabilities determined in operation 202 can correspond to a list of capabilities associated with the communication device 102. In some embodiments the list of capabilities (representing types of content the communication device 102 can interact with) may or may not be in any particular order. It should be understood that this example is illustrative and therefore should not be construed as being limiting in any way.

From operation 204, the method 200 can proceed to operation 204. At operation 204, the communication device 102 can determine content type priorities. The content type priorities can indicate and/or define what priority is given to each type of content. Thus, for example, the content type priorities can assign a relative or absolute priority to each type of content the communication device 102 is configured to interact with. The content type priorities can be used to determine what content types are most and/or least important and should be prioritized or not prioritized if communications associated with the communication device 102 are suspended, downgraded, diminished, or otherwise changed in response to power degradation, or the like.

It can be appreciated that content type priorities can affect the power profile 110. In particular, certain power saving changes (or network or device tuning) may be undertaken to improve power usage, but priorities may make such changes impractical or impossible. For example, if a user or other entity indicates that a particular content type is prioritized such that other operations of the device may be suspended to allow interactions with that content type, the power requirements may be changed to not sacrifice performance for that particular content type. In another example, a particular content type with a low priority may result in an ability to tune/change tuning even if a resulting degradation in performance is experienced if this move will help realize power savings. Thus, the content type priorities can be used to prioritize content types so that the power profile 110 can reflect expected/desired usage of the communication device 102 and adjustment of power profiles in accordance with those expected/desired usage characteristics. It should be understood that these examples are illustrative and therefore should not be construed as being limiting in any way.

From operation 204, the method 200 can proceed to operation 206. At operation 206, the communication device 102 can determine network capabilities of the communication device 102. The network capabilities can indicate and/or define what communication abilities and/or capabilities of the communication device 102. Thus, for example, the network capabilities can indicate what communication channels the communication device 102 is capable of using, what bearers the communication device 102 is capable of using, whether the communication device 102 is capable of operating over multiple channels and/or radio access bearers ("RABs") at once (e.g., whether a communication device 102 is mRAB-capable), what voice and/or data technologies the communication device 102 is capable of using, what frequencies the communication device 102 is capable of using, and the like.

It should be understood that the network capabilities can affect a power profile 110. In particular, tuning of a network and/or device may suggest moving certain communications from a first channel, medium, bearer, or the like having a first power consumption rate to a second channel, medium, bearer, or the like having a second power consumption rate if, but only if, the communication device 102 is capable of communicating over both channels. Thus, it can be appreciated that the priorities and capabilities can be used in conjunction with one another to provide network tuning that meets customers' needs and preferences while providing optimal power performance, in some embodiments. It should be understood that this example is illustrative and therefore should not be construed as being limiting in any way.

From operation 206, the method 200 can proceed to operation 208. At operation 208, the communication device 102 can determine a motion status for the communication device 102. As used herein, a "motion status" can refer to an indication of whether the communication device 102 is mobile or stationary. For example, a vehicle computing system, tablet, smartphone, or the like can generally be indicated as being "mobile" while a home gateway device, PC, server computer, or the like may generally be referred to as "stationary." While these above-enumerated (and other types of) devices may periodically be mobile and/or stationary, these devices typically may be one or the other.

According to some embodiments, the motion status can be a binary indicator such as, for example, "mobile" or "stationary." In some other embodiments, the motion status can include other types of indicators such as, for example, a ratio of usage of the communication device 102 as mobile vs. stationary (or vice versa); an indicator of how often the communication device 102 is mobile, an indication of how often the communication device 102 is stationary, combinations thereof, or the like. Because other types of indicators are possible and are contemplated, it should be understood that these examples are illustrative and therefore should not be construed as being limiting in any way.

Whether a device is mobile or stationary can be important to a power profile 110 for several reasons. For example, if a device is mobile, its power sources may be less predictable and/or more limited (e.g., an internal battery, possible portable power sources, etc.), while stationary devices may generally have more predictable power sources. Thus, devices that are mobile may be deemed to have more limited power sources than a fixed or stationary device that may have very predictable, albeit unlimited, power sources. The power profile 110 can reflect this information so that tuning of the network and/or the communication device 102 may have less of an impact on devices with limited power sources. It should be understood that these examples are illustrative and therefore should not be construed as being limiting in any way.

From operation 208, the method 200 can proceed to operation 210. At operation 210, the communication device 102 can determine a power type for the communication device 102. As used herein, a "power type" can refer to an indication of whether the communication device 102 is on internal power, external power, whether the power source is full, charging, X-percent full, X-percent depleted, combinations thereof, or the like. Thus, the power type can indicate what power capabilities of the communication device 102 exist, as well as a state of the power capabilities.

The power type can indicate whether the communication device 102 is on internal power, external power, whether the power source is fully charged, theoretically unlimited (e.g., a plug in a wall unless the power goes out), charging/replenishing, depleted or partially depleted, charging or partially charged, combinations thereof, or the like. Thus, the power type can indicate what power capabilities of the communication device 102 exist, as well as a state of the power capabilities. Thus, the power type can reflect, for one or more power sources associated with the communication device 102, a status of the power device including power charge, rate of depletion, rate of charging, expected life, etc. These and other types of information can be used when tuning the network and/or the communication device 102 by considering not only current life/charge of the power source, but also a depletion or replenishment trend, an expected life, or the like. It should be understood that these examples are illustrative and therefore should not be construed as being limiting in any way.

From operation 210, the method 200 can proceed to operation 212. At operation 212, the communication device 102 can generate a power profile such as the power profile 110. In some embodiments of the concepts and technologies described herein, the power profile 110 can include one or more indicators including the five indicators determined in operations 202-210. In some other embodiments, the power profile 110 can include other indicators and/or combinations thereof in addition to, or instead of, the above-described indicators.

As such, operation 212 can include generating the power profile 110 and/or the associated indicators. In some embodiments of the concepts and technologies described herein, the power profile 110 can be configured by the communication device 102 and/or other devices for submission within, with, as part of, or for extraction of data for inclusion in a registration message 114, for example as a registration message element that can be submitted to a device or network to register the communication device 102 with the network. It should be understood that this example is illustrative and therefore should not be construed as being limiting in any way.

From operation 212, the method 200 can proceed to operation 214. At operation 214, the communication device 102 can store the power profile 110. The power profile 110 can be stored at the communication device 102 and/or elsewhere. In some embodiments, the power profile 110 can be stored at a memory or other data storage device associated with the communication device 102. In some embodiments, the power profile 110 can be stored by a subscriber identity device such as a SIM card or other subscriber or device identification modules or cards. Because the power profile 110 can be stored in any desired data storage location and/or devices, it should be understood that these examples are illustrative and therefore should not be construed as being limiting in any way.

From operation 214, the method 200 proceeds to operation 216. The method 200 ends at operation 216.

Figure 3:
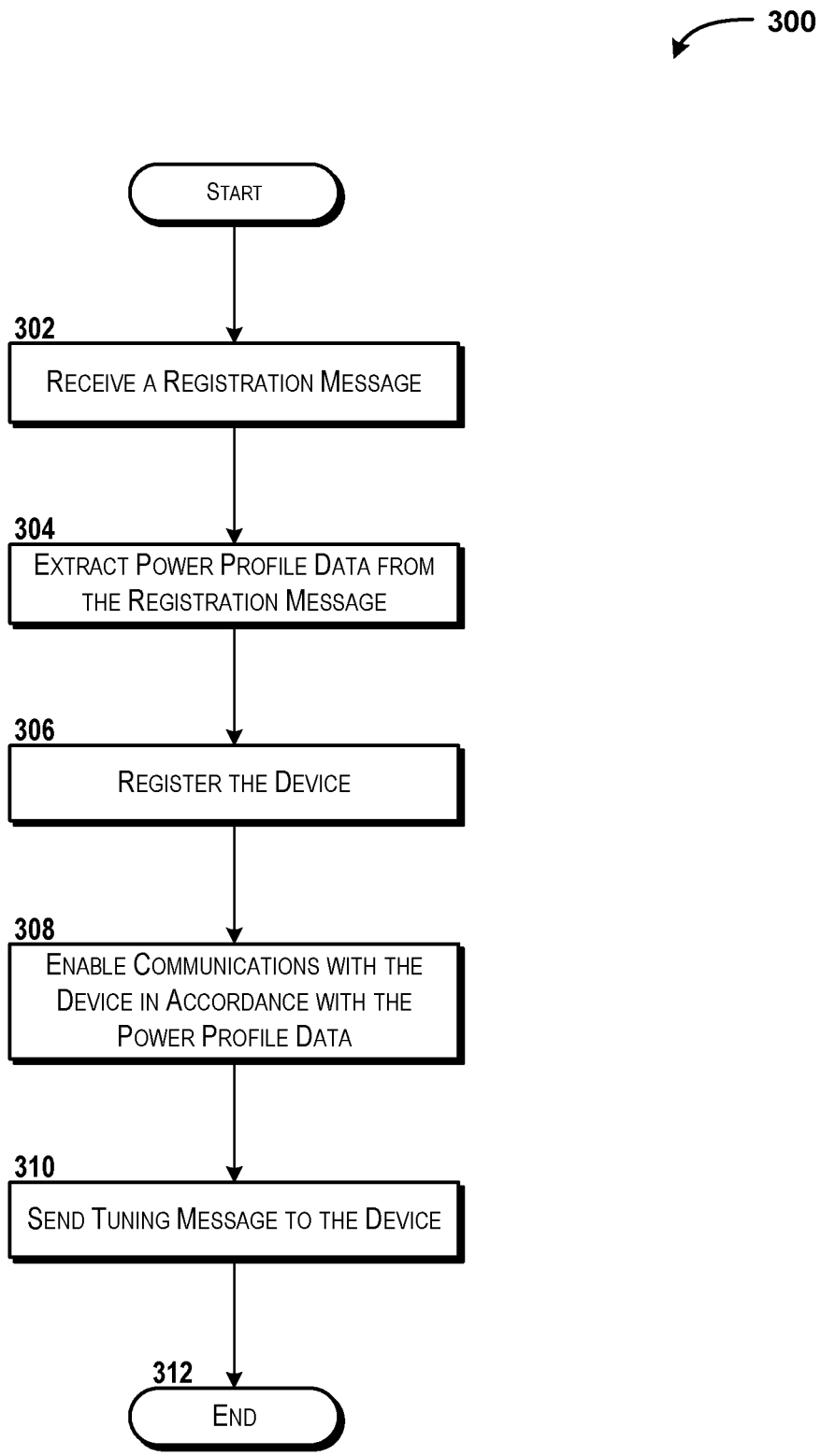
FIG. 3 is a flow diagram showing aspects of a method for tuning a network based on power profile data included in a registration message, according to an illustrative embodiment of the concepts and technologies described herein.

Turning now to FIG. 3, aspects of a method 300 for tuning a network based on power profile data included in a registration message will be described in detail, according to an illustrative embodiment. For purposes of illustrating and describing the concepts of the present disclosure, the method 300 is described as being performed by the communication manager 122 via execution of one or more software modules such as, for example, a communication manager module or application (not labeled in the FIGURES). It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins at operation 302. At operation 302, the communication manager 122 receives a registration message 114. It can be appreciated that the registration message 114 received in operation 302 can be received by various network elements and provided to the communication manager 122; received by a device that includes the communication manager 122; received directly by the communication manager 122; and/or otherwise provided to the communication manager 122. As explained above, the registration message 114 can be received from various devices such as, for example, the communication device 102 or other devices.

The registration message 114 can be received at various times, for example upon powering up of the communication device 102, after a handoff associated with the communication device 102, when an airplane mode (or other mode) is deactivated at the communication device 102, upon roaming of the communication device 102, upon connecting or reconnecting to network hardware, and/or at other times. Because various devices including, but not limited to, the communication device 102 can transmit the registration message 114 at these and/or other times, it should be understood that these examples are illustrative and therefore should not be construed as being limiting in any way. As illustrated and described in detail with reference to FIG. 1, the registration message 114 can include power profile data 112 and/or other data extracted from the power profile 110.

From operation 302, the method 300 can proceed to operation 304. At operation 304, the communication manager 122 can extract power profile data 112 from the registration message 114 received in operation 302. As explained above, the power profile data 112 can be included in a header of the registration message 114, a data element in the registration message 114, a field (or multiple fields) of the registration message 114, and/or included with the registration message 114. Thus, the communication manager 122 can be configured to analyze the registration message 114 and extract, from the registration message 114, the power profile data 112. It should be understood that this example is illustrative and therefore should not be construed as being limiting in any way.

Although not separately illustrated in FIG. 3, it should be understood that the communication device 102 can be configured to search the registration message 114 for the power profile data 112. Thus, the communication manager 122 may or may not be aware that the power profile data 112 is included in the registration message 114 and may or may not analyze the registration message 114. It should be understood that these examples are illustrative and therefore should not be construed as being limiting in any way.

From operation 304, the method 300 can proceed to operation 306. At operation 306, the communication manager 122 can register the device that sent the registration message 114 received in operation 302, for example the communication device 102. According to various embodiments, the communication manager 122 can register the device that sent the registration message with the wireless network 116 and/or with a particular device, system, or node such as, for example, the BTS 118, or the like. According to some other embodiments of the concepts and technologies described herein, the communication manager 122 can prompt other devices to register the communication device 102. Thus, for example, the communication manager 122 can initiate signaling and/or messaging to one or more network devices, nodes, or the like, to initiate registration of the communication device 102. As noted above, registration of the device that sent the registration message 114 can occur at the network level, the device level, or even the component level (e.g., a radio, transceiver, or the like).

As such, some embodiments of the concepts and technologies described herein allow registration of the device that sent the registration message 114 without requiring software or the like and/or without involving devices, nodes, or modules outside of a particular radio, transceiver, receiver, or transmitter that is involved in providing communications capabilities to the device that generated the registration message 114. It should be understood that these examples are illustrative and therefore should not be construed as being limiting in any way.

From operation 306, the method 300 can proceed to operation 308. At operation 308, the communication manager 122 can enable communications in accordance with the power profile data 112 detected in operation 304. In some embodiments, the communication manager 122 can communicate the communication preferences identified by the registration message 114 to one or more hardware, software, or other entities within or associated with the wireless network 116. As explained above, the preferences can be applied at the device level without requiring network interactions, if desired, though this is not necessarily the case. Thus, enabling the communications can include operating a radio or the like in accordance with the preferences and/or passing the preferences on to other devices, systems, networks, or the like. It should be understood that this example is illustrative and therefore should not be construed as being limiting in any way.

From operation 308, the method 300 can proceed to operation 310. At operation 310, the communication manager 122 can send a tuning message 128 to the communication device 102. The communication manager 122 also can prompt other devices to generate and/or send the tuning message 128 to the communication device 102. As illustrated and described above, the tuning message 128 can indicate or reflect how a network was tuned so that the communication device 102 can make corresponding changes to continue communicating with the network. The use of the tuning message 128 will be illustrated and described in more detail below.

From operation 310, the method 300 can proceed to operation 312. The method 300 can end at operation 312.

Figure 4:
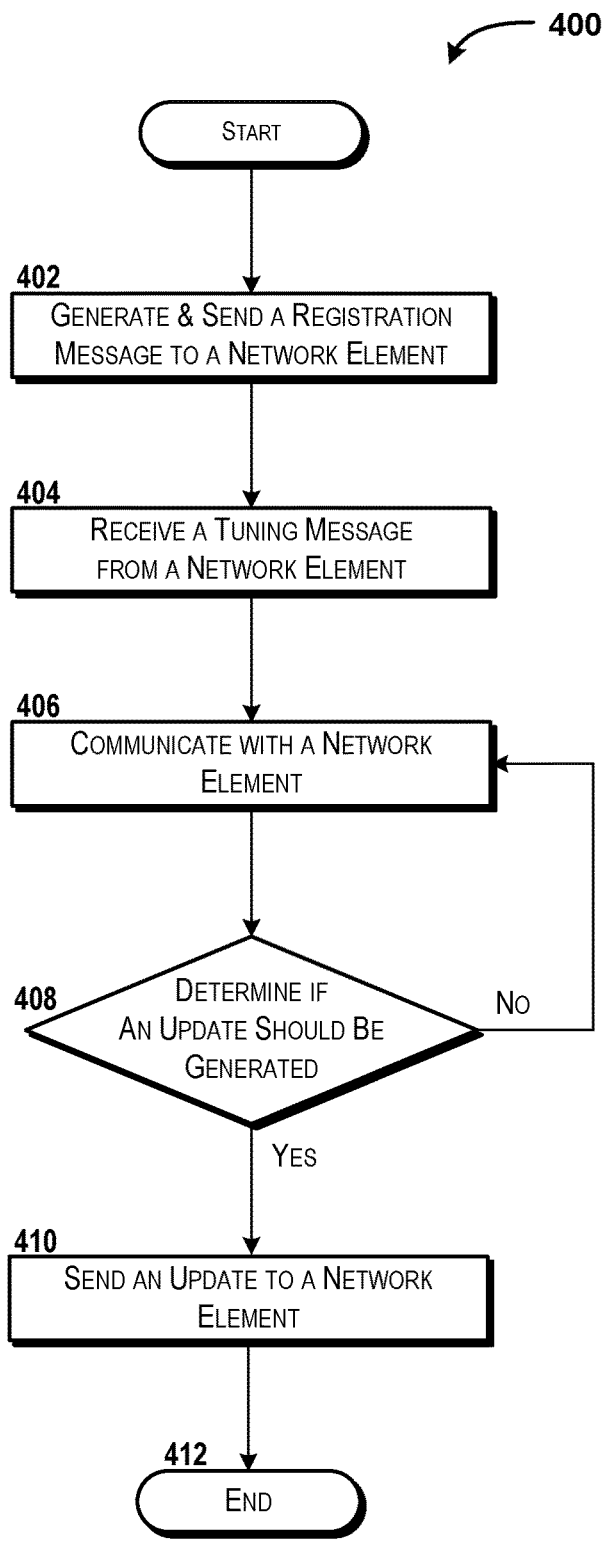
FIG. 4 is a flow diagram showing aspects of a method for sending a power profile update to a network element to update network tuning, according to an illustrative embodiment of the concepts and technologies described herein.

Turning now to FIG. 4, aspects of a method 400 for sending a power profile update to a network element to update network tuning will be described in detail, according to an illustrative embodiment. For purposes of illustrating and describing the concepts of the present disclosure, the method 400 is described as being performed by the communication device 102 via execution of one or more software modules such as, for example, the power management application 108. It should be understood that additional and/or alternative devices and/or network nodes can provide the functionality described herein via execution of one or more modules, applications, and/or other software including, but not limited to, the power management application 108. Thus, the illustrated embodiments are illustrative, and should not be viewed as being limiting in any way.

The method 400 begins at operation 402. At operation 402, the communication device 102 can send a registration message 114 to a network element. In some embodiments, for example, the communication device 102 can send the registration message 114 to a wireless network 116 or an element thereof such as, for example, a BTS 118, an eNodeB, a NodeB, or the like. In some embodiments, the communication device 102 can send the registration message 114 to the network element via an antenna, a radio, a receiver, a transceiver, a combiner, and/or other hardware associated with the BTS 118 (e.g., the antenna 120). As explained above, the registration message 114 can include power profile data 112, which can be generated/populated by the communication device 102 based on the power profile 110. Because communication with wireless networks such as the wireless network 116 is generally understood, the functionality of the communication device 102 with regard to operation 406 will not be described in additional detail.

Although not shown in FIG. 4, it should be understood that the communication device 102 can determine, as part of the method 400 or separately, that a registration message 114 should be sent/generated. Thus, the method 400 can include an operation for determining if a registration message 114 should be generated/sent (e.g., when the communication device 102 is powered on, when roaming onto a new network, after a dropped call, after a handoff, and/or at other times). The method 400 also can include an operation for generating the registration message 114, which can include the communication device 102 accessing the power profile 110, extracting information from the power profile 110, and putting that extracted information into the registration message 114 as the power profile data 112 illustrated and described herein. According to various embodiments of the concepts and technologies described herein, the communication device 102 can obtain the power profile 110 from a SIM module, a memory, and/or other data storage devices or locations, and generate the power profile data 112 as illustrated and described herein. It should be understood that this example is illustrative and therefore should not be construed as being limiting in any way.

From operation 402, the method 400 can proceed to operation 404. At operation 404, the communication device 102 can receive a tuning message such as the tuning message 128 illustrated and described herein. The tuning message 128 can be, but is not necessarily, received from the network element to which the registration message 114 was sent in operation 402, or the tuning message 128 can be received from other network elements and/or devices. Regardless of where the tuning message 128 is received from, the communication device 102 can be configured to tune its communication based on the tuning message 128.

Thus, the communication device 102 can be tuned in accordance with tuning of the network 104, the wireless network 116, and/or the network element, such that communications between the communication device 102 and the network element occur in accordance with the power profile 110. Thus, operation 404 can include accessing a particular bearer, path 126, or the like, and/or communicating in accordance with a particular frequency, time scheme, or the like. Tuning of the network is illustrated and described in more detail below with reference to FIG. 5.

From operation 404, the method 400 can proceed to operation 406. At operation 406, the communication device 102 can communicate with the network element in accordance with the power profile 110 (e.g., in accordance with the power profile data 112 sent in the registration message in operation 402 and the tuning message 128 received in operation 404). Because communication with wireless networks such as the wireless network 116 is generally understood, the functionality of the communication device 102 with regard to operation 406 will not be described in additional detail.

From operation 406, the method 400 can proceed to operation 408. At operation 408, the communication device 102 can determine if an update 124 should be generated. In particular, as explained above, the communication device 102 can be configured, via execution of the power management application 108, to generate an update 124 at various times. For example, the communication device 102 can be configured to determine that a network tuning and/or other communication characteristics should be updated based on a power profile 110 and/or other considerations.

Thus, for example, the communication device 102 can be configured to generate an update 124 when a status of a power source changes (e.g., when a state of the power source changes, when a new power source is added or activated, when a previous power source is removed or deactivated, when the power source hits a threshold level, and/or otherwise experiences a change), when a communication channel ceases to be available or otherwise changes, when the communication device 102 detects communication with a network or network component, when the communication device 102 roams onto a different network or connects to a new network or network component, according to various schedules and/or upon expiration of various time intervals, combinations thereof, or the like. Because the communication device 102 can determine that the update 124 should be generated at additional and/or alterative times or conditions, it should be understood that these examples are illustrative and therefore should not be construed as being limiting in any way.

If the communication device 102 determines, in operation 408, that the update 124 should not be generated (e.g., if power sources, available network capabilities, or the like have not changed), the method 400 can return to operation 406, and communications between the communication device 102 and the network element can proceed as before. As such, it can be appreciated that the method 400 can repeat operations 406-408 until the communication device 102 determines, in any iteration of operation 408, that an update 124 should be generated (e.g., if power sources, available network capabilities, or the like have changed). Additionally, or alternatively, the execution of the method 400 can pause at operation 408 until the communication device 102 determines, in any iteration of operation 408, that the update 124 should be generated. If the communication device 102 determines, in any iteration of operation 408, that the update 124 should be generated, the method 400 can proceed to operation 410.

At operation 410, the communication device 102 can send the update 124 to the network element. The update 124 can include a new version of the power profile data 112 that can be generated based upon the power profile 110 as well as current power capacities, current network capabilities, and the like. Thus, the version of the power profile data 112 generated in operation 410 can differ from the version of the power profile data 112 generated in association with sending the registration message 114 in operation 402. The power profile data 112 can be included in the update 124 and communicated to the network element. Although not separately shown in FIG. 4, it can be appreciated that the network element or other device, node, or the like, can tune the network and/or a portion thereof, as well as prompt delivery of a tuning message 128 to the communication device 102. It should be understood that this example is illustrative and therefore should not be construed as being limiting in any way.

From operation 410, the method 400 can proceed to operation 412. The method 400 can end at operation 412.

Figure 5:
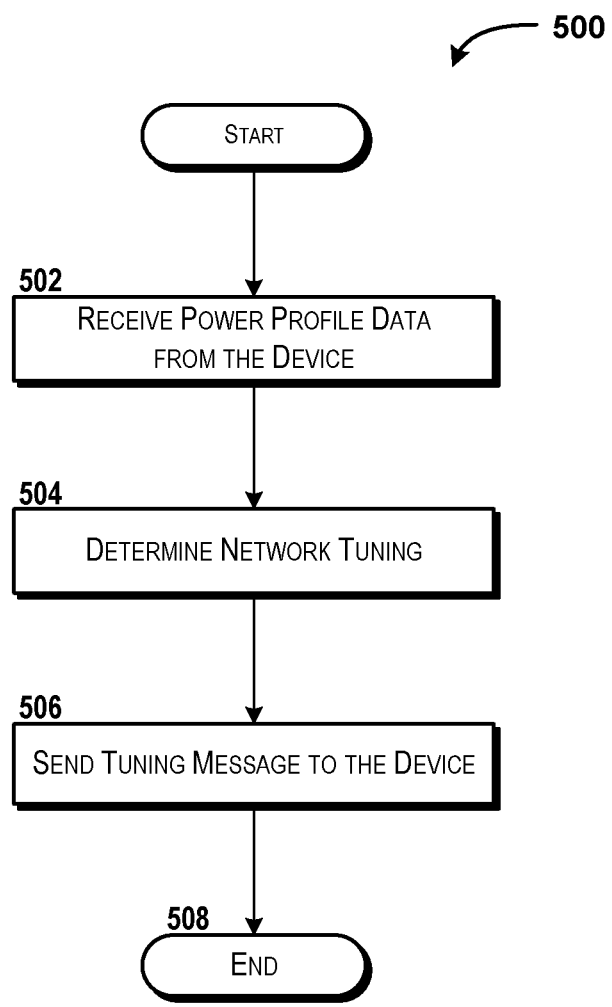
FIG. 5 is a flow diagram showing aspects of a method for updating network tuning in response to receiving power profile data from a device, according to an illustrative embodiment of the concepts and technologies described herein.

Turning now to FIG. 5, aspects of a method 500 for updating network tuning in response to receiving power profile data from a device will be described in detail, according to an illustrative embodiment. For purposes of illustrating and describing the concepts of the present disclosure, the method 500 is described as being performed by the communication manager 122 via execution of one or more software modules such as, for example, a communication manager module or application (not labeled in the FIGURES). It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 begins at operation 502. At operation 502, the communication manager 122 can receive power profile data 112 from a device. In some embodiments, the power profile data 112 can be received from the communication device 102. It can be appreciated that the power profile data 112 can be received in operation 502 as part of or with a registration message 114, an update 124, and/or in, as, or with other communications. In some embodiments, the communication manager 122 can be configured to receive a message (e.g., the registration message 114, the update 124, and/or other communications) and extract, from the message, the power profile data 112. Regardless of how the power profile data 112 is obtained, the communication manager 122 can recognize and use the power profile data 112 as illustrated and described herein.

From operation 502, the method 500 can proceed to operation 504. At operation 504, the communication manager 122 can tune a network. In some embodiments, the communication manager 122 can tune the network 104, the wireless network 116, other networks, and/or portions or devices associated with these networks. As explained above, tuning the network can include terminating some communications; moving communications from one path 126 to another path 126; degrading certain communications and/or communications on a particular path 126; delaying communications (e.g., for a specific time, until a particular path 126 is available, until a new power source is identified, or the like); initiating communications; switching to certain bearers or avoiding certain bearers; combinations thereof; or the like.

From operation 504, the method 500 can proceed to operation 506. At operation 506, the communication manager 122 can send a tuning message such as the tuning message 128 to a device such as, for example, the communication device 102. The tuning message 128 can indicate how the communication manager 122 has tuned the network and/or devices or portions thereof in response to the power profile data 112. Thus, the tuning message 128 can provide information that can be used by a recipient of the tuning message 128 (e.g., the communication device 102), to tune itself to communicate with the network and/or portion thereof. Thus, the tuning message 128 sent in operation 506 can be used by a recipient to communicate with the network in accordance with the power profile 110. The receipt and use of the tuning message 128 is illustrated and described above with reference to FIG. 4.

From operation 506, the method 500 can proceed to operation 508. The method 500 can end at operation 508.

Figure 6:
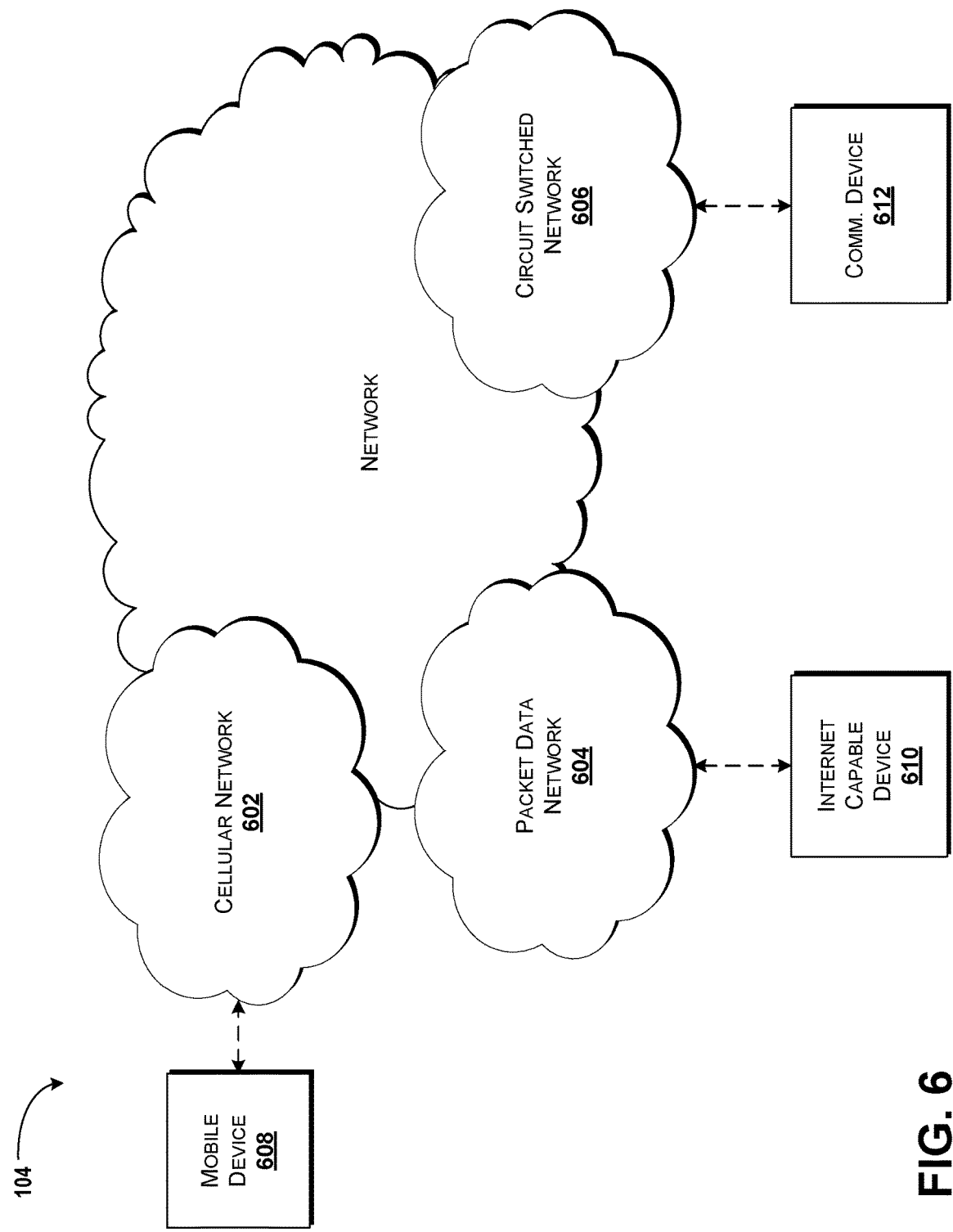
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
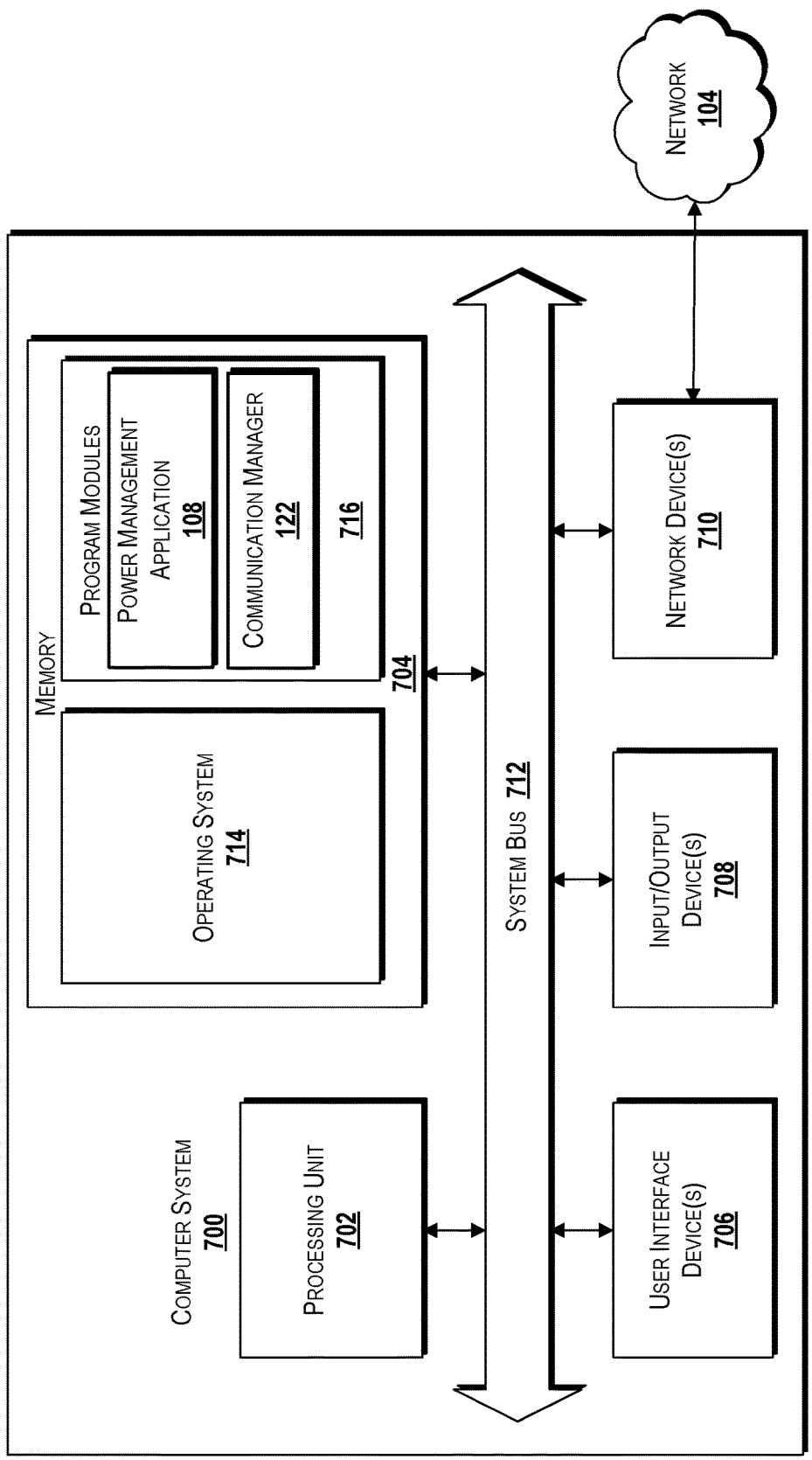
FIG. 7 is a block diagram illustrating an example computer system configured to tune networks and user equipment using a power profile, according to some illustrative embodiments of the concepts and technologies described herein.

FIG. 7 is a block diagram illustrating a computer system 700 configured to provide the functionality described herein for tuning networks and user equipment using a power profile, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the power management application 108 and/or the communication manager 122. These and/or other programs can be embodied in computer-readable media containing instructions that, when executed by the processing unit 702, perform one or more of the methods 200, 300, 400, and/or 500 described in detail above with respect to FIGS. 2-5. According to embodiments, the program modules 716 may be embodied in hardware, software, firmware, or any combination thereof. Although not shown in FIG. 7, it should be understood that the memory 704 also can be configured to store the power profile 110, the power profile data 112, the registration message 114, the update 124, the tuning message 128, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
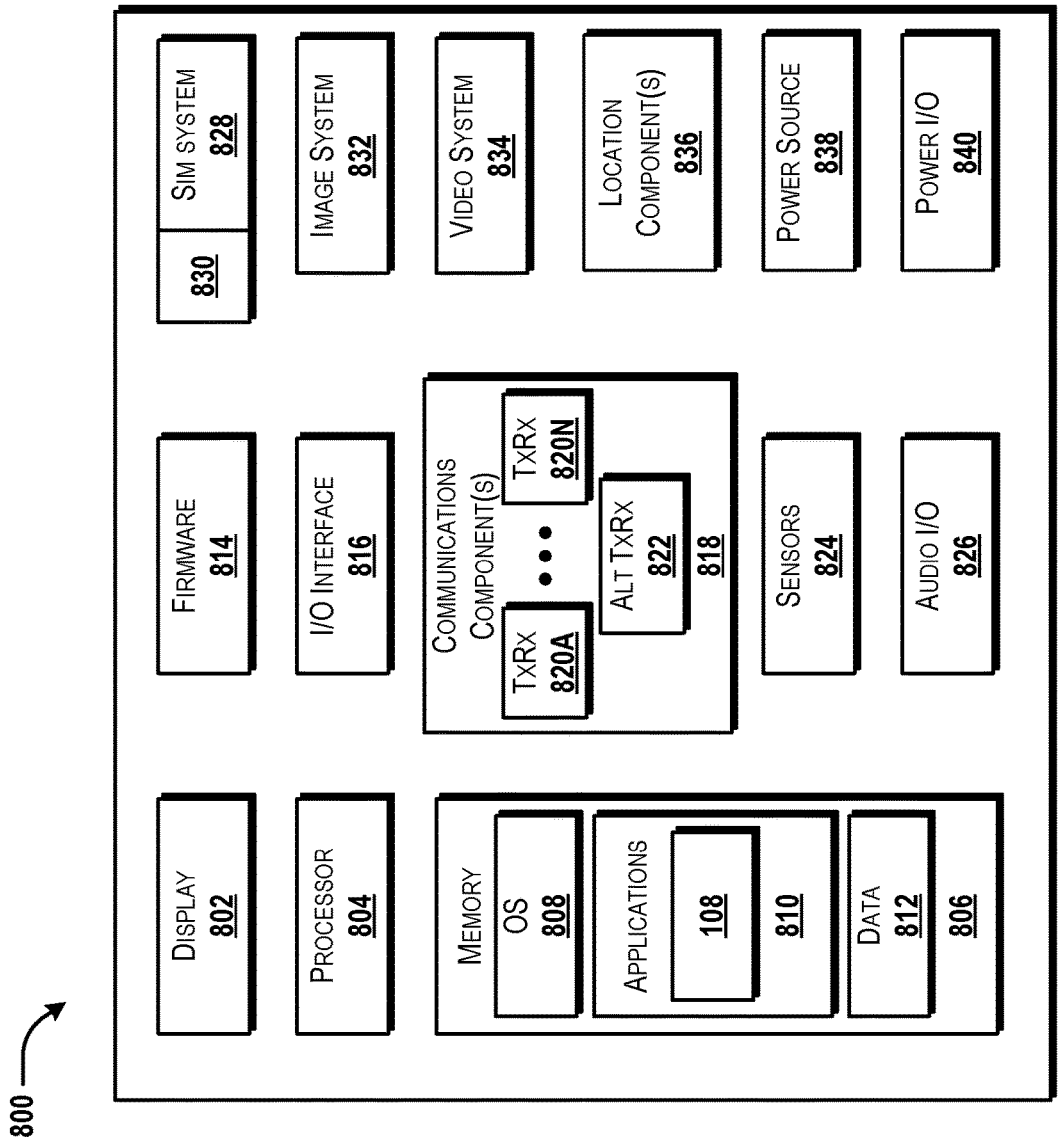
FIG. 8 is a block diagram illustrating an example mobile device configured to generate and use a power profile, according to some illustrative embodiments of the concepts and technologies described herein.

Turning now to FIG. 8, an illustrative mobile device 800 and components thereof will be described. In some embodiments, the communication device 102 described above with reference to FIGS. 1-7 can be configured as and/or can have an architecture that can be similar or identical to the mobile device 800 described herein in FIG. 8. It should be understood, however, that the communication device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, power profile information, current path information, current network status and/or connection status, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the power management application 108, the communication manager 122, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, generating the updates 124, viewing connection status, modifying power profiles 110, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the power management application 108, the communication manager 122, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, power profile 110, the power profile data 112, the registration message 114, the update 124, the tuning message 128, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like.

In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for tuning networks and user equipment using a power profile have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A device comprising:
   a processor; and
   a memory that stores computer-executable instructions that, when executed by the processor, cause the processor to perform operations comprising
      generating a power profile for a communication device, wherein the power profile indicates a type of power source that is associated with the communication device and a content type priority that is associated with the communication device,
      generating a registration message that comprises power profile data that is based on the power profile,
      sending the registration message to a communications network to request registration with the communications network,
      receiving a tuning message that indicates a tuning to be used for communications with the communications network, wherein the tuning is based on the power profile data, and
      tuning the communication device to communicate with the communications network based on the tuning message.

2. The device of claim 1, wherein the computer-executable instructions, when executed by the processor, cause the processor to perform operations further comprising:
   determining that an update should be generated based on detecting a status change of a power source;
   generating an update comprising a new version of the power profile data; and
   sending the update to the communications network.

3. The device of claim 1, wherein the computer-executable instructions, when executed by the processor, cause the processor to perform operations further comprising:
   determining that an update should be generated based on detecting a change to a communication channel;
   generating an update comprising a new version of the power profile data; and
   sending the update to the communications network.

4. The device of claim 1, wherein sending the registration message comprises sending the registration message to a network element, and wherein the power profile data is used to tune the network element for conducting communications with the communication device.

5. The device of claim 1, wherein generating the power profile further comprises:
   determining content type capabilities associated with the communication device;
   determining content type priorities associated with the communication device;
   determining network capabilities associated with the communication device; and
   determining a motion status associated with the communication device.

6. The device of claim 5, wherein the power profile indicates the content type capabilities, the network capabilities, and the motion status.

7. The device of claim 6, wherein tuning comprises moving a communication from a first path to a second path.

8. The device of claim 6, wherein tuning comprises terminating a communication.

9. A computer storage medium having computer-executable instructions stored thereon that, when executed by a processor, cause the processor to perform operations comprising:
- generating a power profile for a communication device, wherein the power profile indicates a type of power source that is associated with the communication device and a content type priority that is associated with the communication device;
- generating a registration message that comprises power profile data that is based on the power profile;
- sending the registration message to a communications network to request registration with the communications network;
- receiving a tuning message that indicates a tuning to be used for communications with the communications network, wherein the tuning is based on the power profile data; and
- tuning the communication device to communicate with the communications network based on the tuning message.

10. The computer storage medium of claim 9, wherein the computer-executable instructions, when executed by the processor, cause the processor to perform operations further comprising:
- determining that an update should be generated based on detecting a status change of a power source;
- generating an update comprising a new version of the power profile data; and
- sending the update to the communications network.

11. The computer storage medium of claim 9, wherein the computer-executable instructions, when executed by the processor, cause the processor to perform operations further comprising:
- determining that an update should be generated based on detecting a change to a communication channel;
- generating an update comprising a new version of the power profile data; and
- sending the update to the communications network.

12. The computer storage medium of claim 9, wherein sending the registration message comprises sending the registration message to a network element, and wherein the power profile data is used to tune the network element for conducting communications with the communication device.

13. The computer storage medium of claim 9, wherein generating the power profile further comprises:
- determining content type capabilities associated with the communication device;
- determining content type priorities associated with the communication device;
- determining network capabilities associated with the communication device; and
- determining a motion status associated with the communication device.

14. The computer storage medium of claim 13, wherein the power profile indicates the content type capabilities, the network capabilities, and the motion status.

15. A method comprising:
- generating, by a processor that executes a power management application, a power profile for a communication device, wherein the power profile indicates a type of power source that is associated with the communication device and a content type priority that is associated with the communication device;
- generating, by the processor, a registration message that comprises power profile data that is based on the power profile;
- sending, by the processor, the registration message to a communications network to request registration of the communication device with the communications network;
- receiving, by the processor, a tuning message that indicates a tuning to be used for communications with the communications network, wherein the tuning is based on the power profile data; and
- turning, by the processor, the communication device to communicate with the communications network based on the tuning message.

16. The method of claim 15, further comprising:
- determining that an update should be generated based on detecting a status change of a power source;
- generating an update comprising a new version of the power profile data; and
- sending the update to the communications network.

17. The method of claim 15, further comprising:
- determining that an update should be generated based on detecting a change to a communication channel;
- generating an update comprising a new version of the power profile data; and
- sending the update to the communications network.

18. The method of claim 15, wherein sending the registration message comprises sending the registration message to a network element, and wherein the power profile data is used to tune the network element for conducting communications with the communication device.

19. The method of claim 15, wherein generating the power profile further comprises:
- determining content type capabilities associated with the communication device;
- determining content type priorities associated with the communication device;
- determining network capabilities associated with the communication device; and
- determining a motion status associated with the communication device.

20. The method of claim 19, wherein the power profile indicates the content type capabilities, the network capabilities, and the motion status.

* * * * *